(12) United States Patent
Dixon et al.

(10) Patent No.: US 8,650,221 B2
(45) Date of Patent: Feb. 11, 2014

(54) SYSTEMS AND METHODS TO ASSOCIATE INVOICE DATA WITH A CORRESPONDING ORIGINAL INVOICE COPY IN A STACK OF INVOICES

(75) Inventors: Graeme Neville Dixon, Carmel, NY (US); Thomas Yu-Kiu Kwok, Washington Township, NJ (US); Jim A. Laredo, Katonah, NY (US); Sridhar Maradugu, Yorktown Heights, NY (US); Thao Ngoc Nguyen, Katonah, NY (US); Brian L. White, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 11/852,591

(22) Filed: Sep. 10, 2007

(65) Prior Publication Data

US 2009/0067013 A1 Mar. 12, 2009

(51) Int. Cl.
*G06F 17/30* (2006.01)
*H04L 9/32* (2006.01)

(52) U.S. Cl.
USPC .......................................... 707/802; 713/176

(58) Field of Classification Search
None
See application file for complete search history.

(56) References Cited

U.S. PATENT DOCUMENTS

| | | | |
|---|---|---|---|
| 5,991,709 A | 11/1999 | Schoen | |
| 6,263,335 B1 | 7/2001 | Paik et al. | |
| 7,350,708 B2 * | 4/2008 | Melick et al. | 235/462.01 |
| 2002/0023055 A1 * | 2/2002 | Antognini et al. | 705/40 |
| 2002/0049705 A1 | 4/2002 | Haviv-Segal et al. | |
| 2004/0261016 A1 | 12/2004 | Glass et al. | |
| 2005/0033671 A1 * | 2/2005 | Hahn-Carlson | 705/34 |
| 2005/0289456 A1 | 12/2005 | Bier | |
| 2006/0095830 A1 * | 5/2006 | Krishna et al. | 715/500 |
| 2006/0195491 A1 * | 8/2006 | Nieland et al. | 707/204 |
| 2006/0230044 A1 * | 10/2006 | Utiger | 707/10 |
| 2006/0288015 A1 * | 12/2006 | Schirripa et al. | 707/100 |
| 2007/0046983 A1 * | 3/2007 | Hull et al. | 358/1.15 |
| 2007/0198560 A1 * | 8/2007 | Foygel et al. | 707/101 |
| 2007/0233525 A1 * | 10/2007 | Boyle | 705/4 |
| 2008/0120129 A1 * | 5/2008 | Seubert et al. | 705/1 |
| 2008/0235227 A1 * | 9/2008 | Kwok et al. | 707/6 |

FOREIGN PATENT DOCUMENTS

| | | |
|---|---|---|
| WO | 9812616 | 3/1998 |
| WO | 9816890 | 3/1998 |
| WO | 9855945 | 12/1998 |
| WO | 0045297 | 8/2000 |
| WO | 20050101727 | 2/2005 |

\* cited by examiner

*Primary Examiner* — Tarek Chbouki
(74) *Attorney, Agent, or Firm* — Tutunjian & Bitetto, P.C.; Preston Young

(57) ABSTRACT

A system and method for associating documents includes providing a plurality of scanned documents of different types and identifying a document type for each scanned document by comparing a determined pattern for each scanned document to known document patterns. Metadata values are extracted from each scanned document using metadata labels, and each scanned document is identified by using extracted metadata values. A stored electronic record is associated with each scanned document by employing the extracted metadata values such that a relationship between the stored electronic record and the associated scanned document is determined and stored.

20 Claims, 5 Drawing Sheets

I2C Invoice Retrieval and Storage Tables

Table 1 (Invoice Type) - invoice transaction type numbers and names for different tenant Id

| InvoiceTypeNo | InvoiceTypeName | tenantId |
|---|---|---|
| bigint, primary key | varchar(256) | varchar(256) |

Table 2 (InvoicePattern) - Patterns and rules for each known invoice transaction type

| PatternRefNum | InvoiceTypeNo | PageNo | FirstLast | LineNo | TopBot | MatchInd | Phrase |
|---|---|---|---|---|---|---|---|
| bigint, primary key | same as table 1 | smallint | smallint 1-first 2-last | smallint | smallint 1-top 2-bottom | smallint 1-match 2-missing | varchar (512) |

Table 3 (MetadataLabel) - Metadata labels with locations and rules for each known invoice type
Note: Two metadata lables for each invoice transaction type.

| MetadataRefNum | InvoiceTypeNo | MetadataRefName | MetadataLabel | PageNo | LineNo | WordNo | NoOfTerms | Position |
|---|---|---|---|---|---|---|---|---|
| bigint, primary key | bigint, same as table 1 | varchar (256) | varchar (256) | smallint | smallint | smallint | smallint | smallint 1-Left 2-Right 3-Above 4-Below |

Table 4 (Metadata Value) - Name, fileKey, two pairs of metadata name and value for each matched invoice
Note: Use Value1 as InvoiceName (same as FileName). For test only

| Invoice RefNum | InvoiceTypeNo | LSSFileKey | InvoiceName | Label1 | Value1 | Label2 | Value2 |
|---|---|---|---|---|---|---|---|
| bigint primary key | bigint same as table 1 | varchar(256) from LSS | varchar (256) | varchar(256) from table 2 | varchar (256) | varchar(256) from table 2 | varchar (256) |

Table 5 (InvoiceStack) - Incoming and unresolved stack of invoices
(Note: Use the original or incoming FileName for unresolved FileName)

| FileRefNum | TenantId | dbSourceName | LSSFileKey | FileName | FileInd |
|---|---|---|---|---|---|
| bigint primary key | varchar (256) same as table 1 | varchar (256) | varchar(256) from LSS | varchar (256) | smallint 1-new incoming 2-new unresolved 3-old unresolved |

FIG. 5

SYSTEMS AND METHODS TO ASSOCIATE INVOICE DATA WITH A CORRESPONDING ORIGINAL INVOICE COPY IN A STACK OF INVOICES

BACKGROUND

1. Technical Field

The present invention relates to metadata extraction and correlation from documents, and more particularly to systems and methods for extracting specific metadata automatically from a particular document in a stack or collection of documents of different types to associate documents.

2. Description of the Related Art

In any existing invoice transaction, process and payment solutions which provide invoice services to an enterprise, a number of improvements can be made. In most generic invoice transactions, process solutions and payment solutions, the XML invoice data are fed to generic invoice transaction, and process and payment systems through generic Enterprise Transaction systems. The corresponding original invoice copies in non-XML formats are uploaded separately to the invoice system through an Enterprise Resource Planning (ERP) system in a bulk process. A corresponding original invoice copy for the customer is a separate document and not provided to the customer when the customer is billed for payment on a Web application invoice. Therefore, a need exists for associating each original invoice copy with its XML invoice transaction and processes.

Currently, metadata, such as the invoice transaction identification, is used as a link reference. The metadata can be manually input into any invoice transaction, process and payment system. However, this manual process is tedious, costly and prone to errors.

SUMMARY

In accordance with present principles, embodiments disclosed herein associate or link an extensible markup language (XML) invoice or data with its corresponding original invoice copy by automatically matching at least one of their metadata, such as an invoice transaction identifier, in a database table in a number of steps. The metadata, such as an invoice transaction identification, from the XML invoice data can be easily parsed using any generic XML parser. It is often difficult to extract specific metadata, such as the invoice transaction identification, automatically for each invoice from a stack of many invoices with different invoice transaction types. This is because the location of the specific metadata is located in different locations. It is more difficult for different transaction types and if the different invoice transaction types are semi-structured or un-structured documents.

The present embodiments provide an online presentation of extensible markup language (XML) invoice data and options to attach their corresponding original copies for review and printing. This will benefit both the enterprise and its customers. The attachment of the original invoice copy would greatly improve invoice clarity, accuracy, reduce the number of disputes and improve customer satisfaction.

A novel method is described to extract specific metadata, such as the invoice transaction identifier, automatically, for each invoice from a plurality of invoices in different invoice transaction types. When the novel method cannot extract the specific metadata, due to unknown invoice transaction types or other reasons, a new unresolved invoice stack of these unresolved invoices will be created. Moreover, graphical user interfaces (GUIs) are provided for an administrator or user to manually extract the invoice transaction identifiers for these unresolved invoices in an unresolved invoice stack.

A system and method for associating documents includes providing a plurality of scanned documents of different types and identifying a document type for each scanned document by comparing a determined pattern for each scanned document to known document patterns. Metadata values are extracted from each scanned document using metadata labels, and each scanned document is identified by using extracted metadata values. A stored electronic record is associated with each scanned document by employing the extracted metadata values such that a relationship between the stored electronic record and the associated scanned document is determined and stored.

In other embodiments, the stored electronic record includes an extensible markup language document memorializing a purchase associated with a sales receipt document of the plurality of PDF documents and the system/method further comprises invoicing a customer with an invoice including a copy of the receipt and the extensible markup language document in an on-line application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a diagram depicting a plurality of storage tables employed in implementing an illustrative embodiment.

DETAILED DESCRIPTION OF PREFERRED EMBODIMENTS

Figure 1:
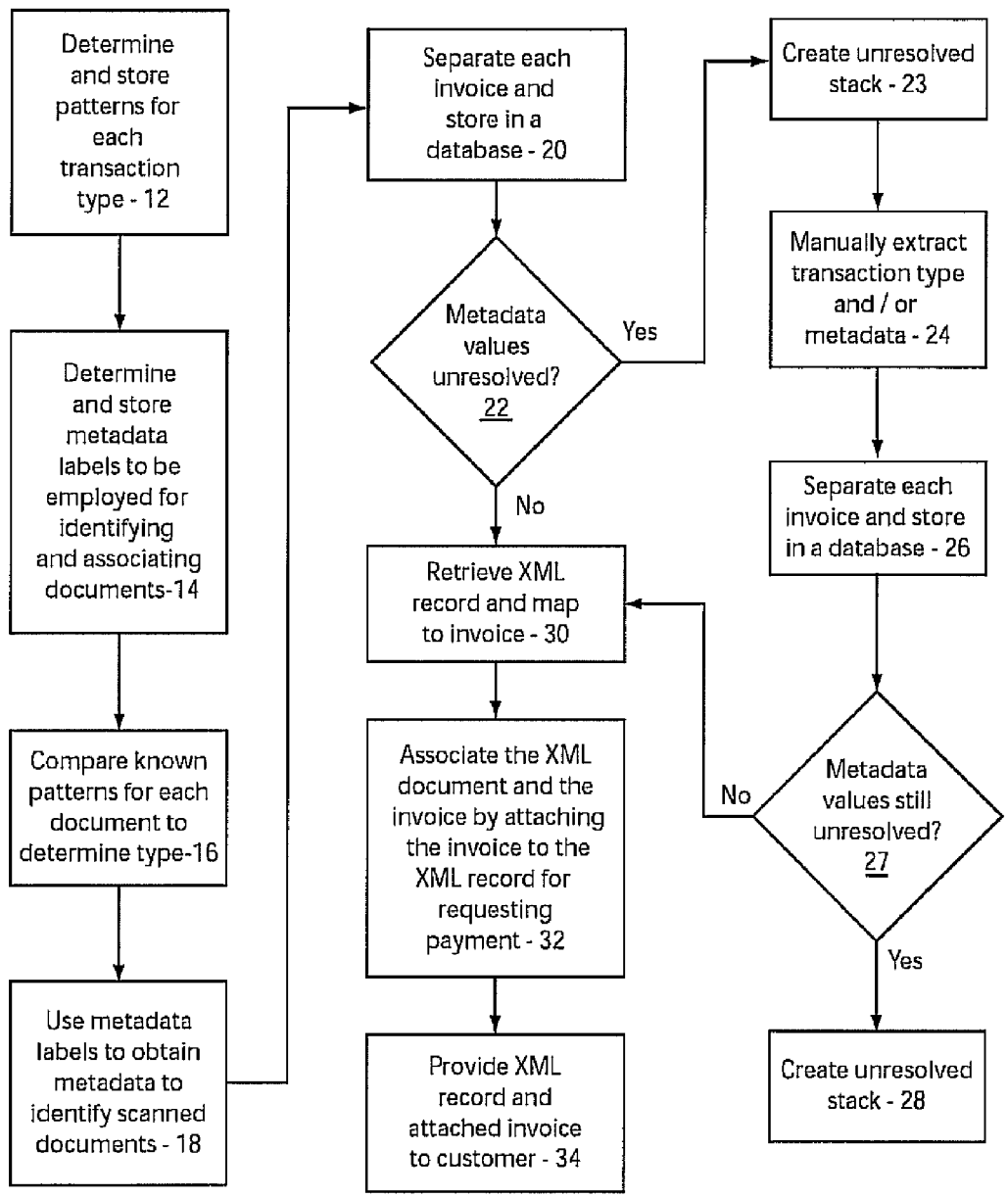
FIG. 1 is a block/flow diagram showing a system/method for an automatic data extraction system for electronic contract documents in accordance with one illustrative embodiment.

Systems and methods for associating documents (paper or electronic) are provided. The present embodiments, convert files into a searchable format and identify relevant information to permit an association between at least two documents. In one embodiment, a portable document format (PDF) file stack is automatically converted into a text file stack, and each individual document (e.g., invoice) is converted with its transaction type. The embodiment separates, creates and stores each identified invoice as an individual PDF file. The embodiment extracts metadata values from each identified invoice and uses a metadata value to name the invoice PDF file. The embodiment also separates, creates and stores a stack of unresolved PDF invoices.

Graphical user interfaces (GUIs) are provided for inputting unique patterns of first and last pages for each invoice transaction type. GUIs are also provided for inputting metadata labels for each invoice transaction type by an administrator. GUIs are available for manually selecting invoice transaction types, and entering invoice names and their metadata values for an unresolved stack of invoices. A commonly assigned disclosure to Kwok, et al. entitled "SYSTEMS AND METHODS TO EXTRACT DATA AUTOMATICALLY FROM A COMPOSITE ELECTRONIC DOCUMENT", Ser. No. 11/472,868, filed on Jun. 22, 2006 is hereby incorporated by reference in its entirety.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The following embodiments will be described in terms of an Invoice to Cash (I2C) application as an Invoice Retrieval and Storage component, which employs invoices as documents. It should be understood that the present invention is broader and may be employed with other systems types and may employ other document types. In addition, the document types may include and/or employ both electronic and paper documents.

Referring now to the drawings in which like numerals represent the same or similar elements and initially to FIG. 1, a system/method for associating documents is illustratively shown. In block 12, characteristics or specific patterns of each known invoice transaction type are input into a database of any generic invoice transaction or process systems. Graphical user interfaces (GUIs) may be provided for an administrator or user to input this information. Other input methods, such as executing a set of sequential query language (SQL), can be used as well. Patterns may be manually input or automatically determined using a sample transaction document. Patterns may include things such as a number of lines in a header, a metadata label, a formatting feature, etc.

In block 14, for each known invoice transaction type, a few metadata labels are input from extracted values from the invoices. The invoices are preferably PDF files although other scanned or digitized formats are possible. At least one to two of these metadata values, such as an invoice transaction identification number, are used to link or associate corresponding XML invoice data. Different metadata labels can be used for different invoice transaction types. These metadata labels are stored in a database of any generic invoice transaction or process systems. GUIs can be provided for the administrator or user to input this information. Other inputting methods, such as executing a set of SQL inquires, can also be employed.

In block 16, characteristics or specific patterns inputted in block 12 are employed from the database to identify each invoice according to its invoice transaction type in an incoming stack of invoices from the generic invoice transaction or process system. These invoices can be for different invoice transaction types.

In block 18, the metadata labels inputted in block 14 are employed to extract values from each identified individual invoice file. At least one of these extracted metadata values is a value used to link or associate the value with its corresponding XML invoice data, such as, e.g., the invoice transaction number. Other extracted metadata values can be used as a cross check to the corresponding XML invoice data. One or a combination of a few of these extract metadata values, such as the invoice transaction number, can be used to name this identified individual invoice file.

In block 20, each identified invoice is separated as an individual invoice so that it can be stored in the database of the generic invoice transaction or process system. In block 22, when the metadata values of their corresponding metadata labels inputted in block 14 cannot be extracted due to an unknown invoice transaction type or other reasons, a new unresolved invoice stack is created for these unresolved invoices in block 23.

In block 24, an inputting method(s) is provided, such as a GUI, for an administrator or user to manually extract at least one metadata value corresponding to a metadata label used to link or associate an invoice with its corresponding XML invoice data for each one of these unresolved invoices in the unresolved invoice stack.

In block 26, similar to block 20, the manually identified invoice is then separated as an individual invoice so that it can be stored in the database. In block 27 if the metadata values are still unresolved, then, as in block 22, another new unresolved invoice stack is created for all the invoices that even the administrator or user cannot identify manually in block 28.

In block 30, the extraction of at least one specific parameter, such as invoice transaction identification, is made from XML invoice data in an invoice Web page of an invoice Web application using an XML parser, for example. This specific parameter is used to map and match the metadata values of the original invoice copies stored in the database of the generic invoice transaction or process system. The invoice or scanned document (e.g., PDF file) will be associated with the XML transaction record.

In block 32, the corresponding original invoice copy with the matching specific parameter and metadata value will be retrieved from the database and uploaded as an attachment to be associated with its corresponding XML invoice data in the invoice Web page of the Web application to provide a payment request. The attachment of this original invoice copy will improve the invoice clarity and accuracy, reduce number of disputes and improve customer satisfaction.

Figure 2:
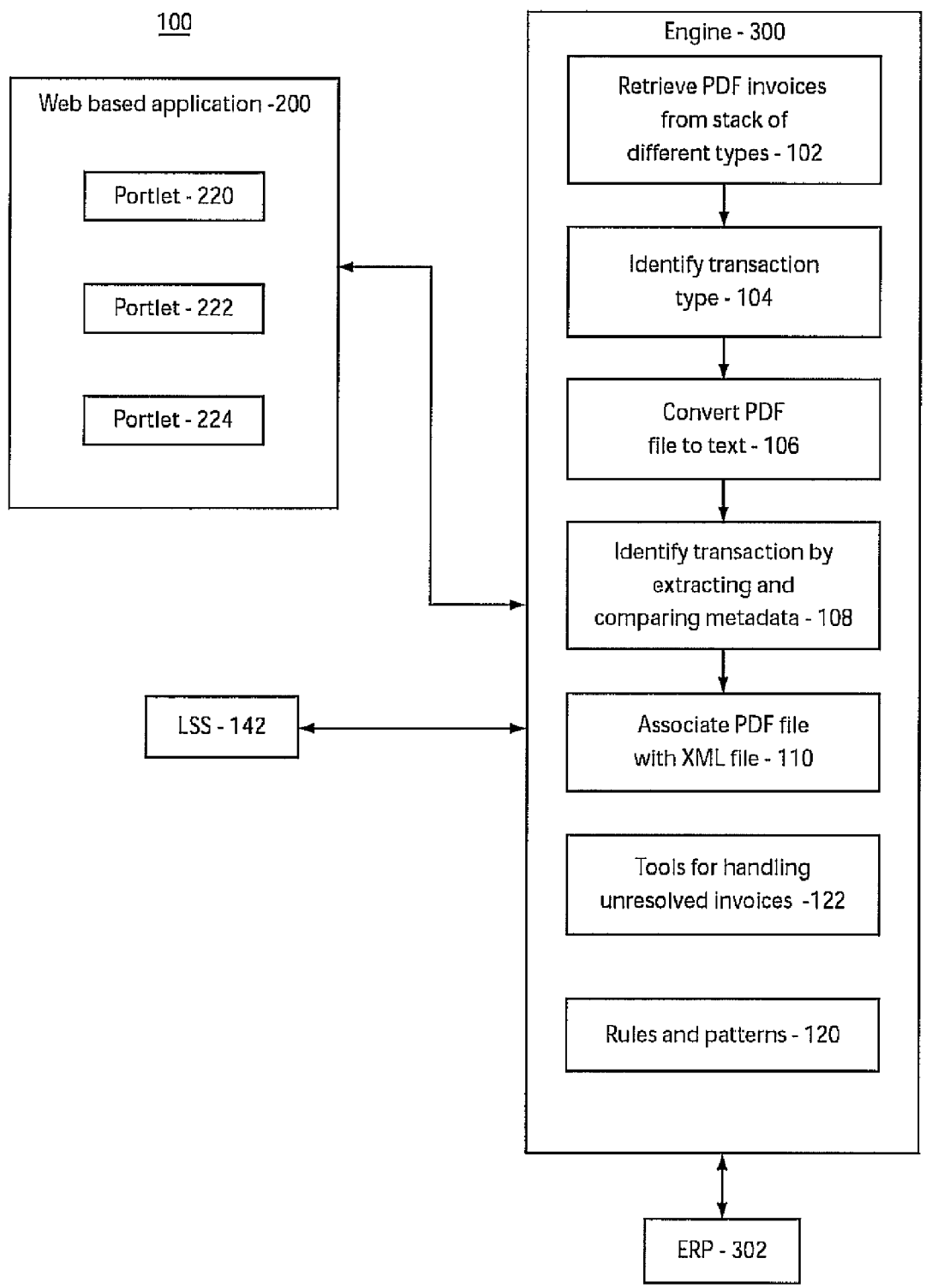
FIG. 2 is a block/flow diagram of a system/method showing the system of FIG. 1 in greater detail in accordance with another illustrative embodiment.

Referring to FIG. 2, a invoice retrieval and storage component system/method 100 for associating documents is described in greater detail. In a particularly useful embodiment, focus is on an invoice retrieval and storage component 100 used in any invoice to cash (I2C) application. Invoice retrieval and storage component system/method 100 includes two main components 200 and 300.

Figure 3:
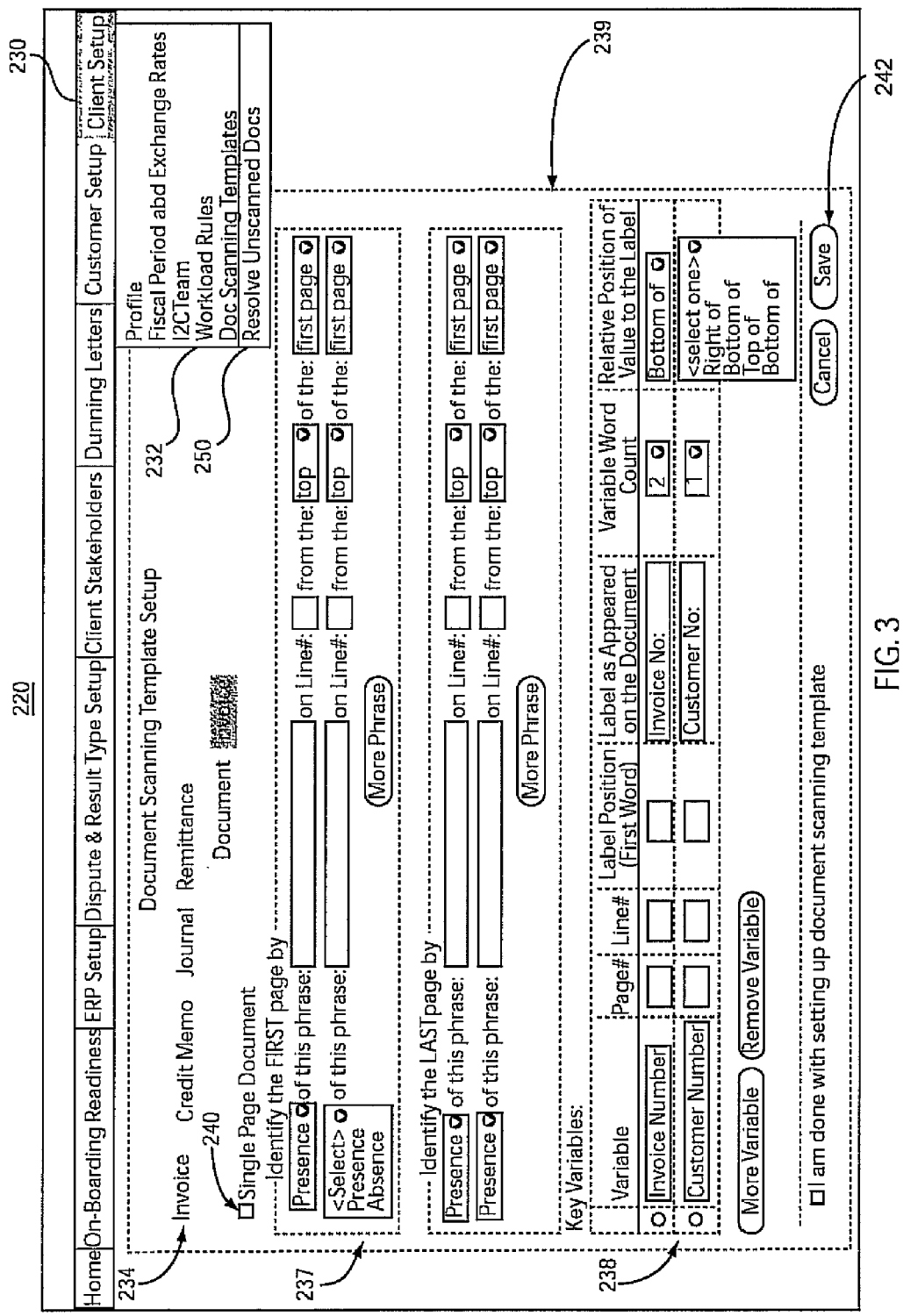
FIG. 3 is a diagram depicting a document template portal in accordance with an illustrative embodiment.
Figure 4:
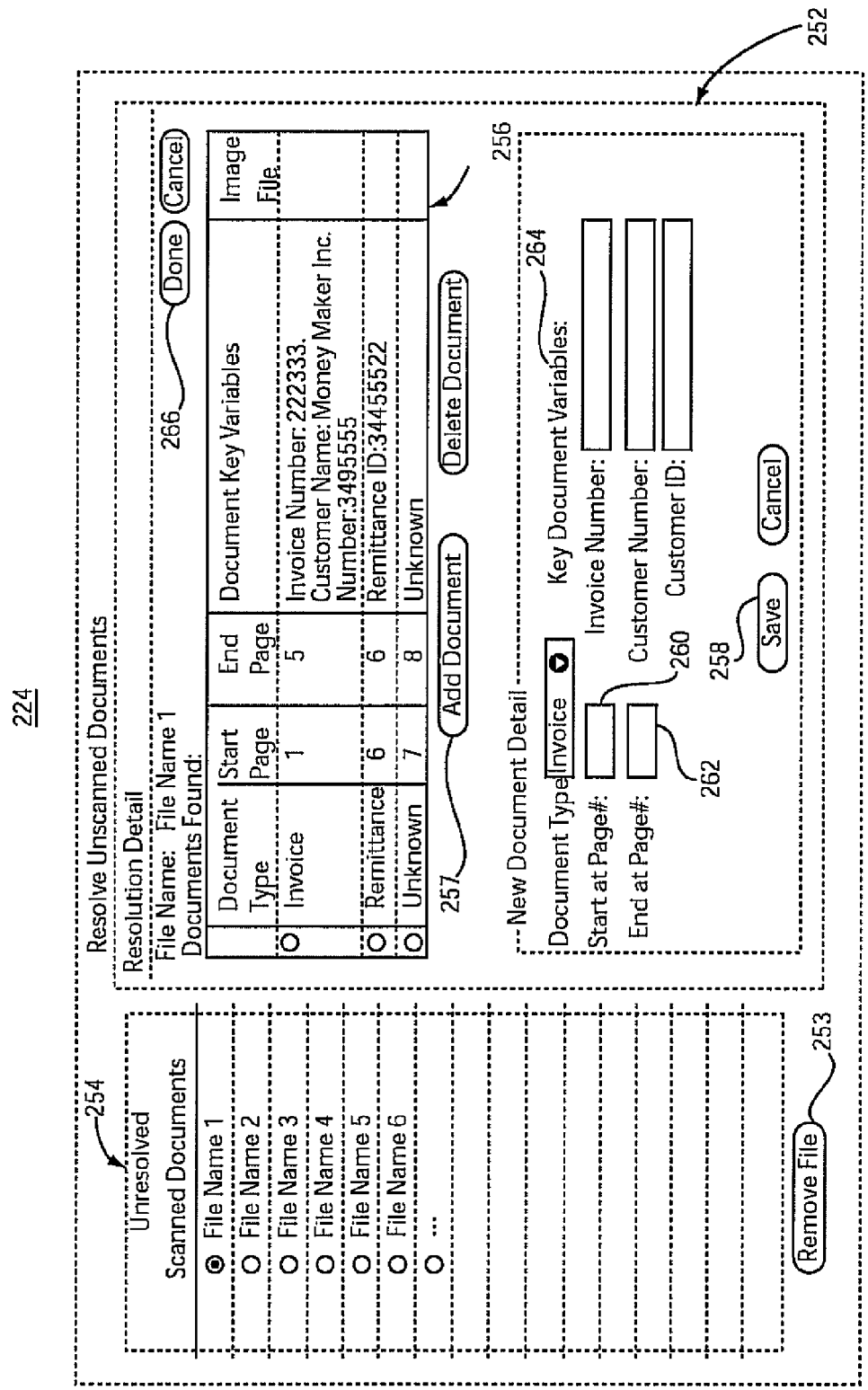
FIG. 4 is a diagram depicting an unresolved document portal in accordance with another illustrative embodiment.

The first component is a Web based application 200 and includes a plurality of portlets 220, 222, and 224 as shown in FIGS. 3 and 4. These portlets 220, 222, and 224 are accessed by clicking their corresponding URL links on any I2C administrator portlet that passes or provides information on tenant ID (which is, e.g., an identifier for the user) or a database connection to the portlets 220, 222, 224 in the Web based application 200.

A second component of the invoice retrieval and storage component system/method 100 is a stand-alone engine 300. Engine 300 uses information entering from the Web component 200 by the administrator to identify each individual invoice with its transaction type from a stack of PDF invoices, and extracts metadata values from the files. Engine 300 also parses and converts the PDF file into a text file.

Administrator inputs metadata labels and rules 120 for each invoice transaction type. A user identifies each invoice type, enters invoice name and its metadata values for a stack of unresolved PDF invoices by employing a portlet interface and using tools for handling the unresolved invoices in block 122.

The invoice retrieval and storage component system/method 100 retrieves individual PDF invoices from a stack of invoices of different types in block 102. System 100 has input thereto, unique patterns for each invoice transaction type to identify each invoice transaction type in block 104. For example, a transaction type may employ a same form having a similar pattern (e.g., the heading, a return policy statement, etc.). These patterns may be identified by system 100 and employed to classify the PDF file. These patterns may be recognized by a pattern recognition program. The system 100 may employ unique patterns on a portion of the PDF file. In one example, system 100 employs one or more patterns on a first page and a last page of the file or document. In another embodiment, two unique patterns are employed to identify a first page of the invoice transaction type, and two unique patterns are employed to identify the last page of the invoice transaction type.

Engine 300 may convert the PDF files to text in block 106. Once the transaction type is identified, the transaction needs to be identified by extracting and comparing metadata in block 108. Engine 300 employs metadata labels to extract metadata values for each invoice transaction, e.g., two metadata values for each invoice transaction.

When a stack of invoices of different transaction types in portable document format (PDF) format with text has arrived into any generic invoice to cash application, each invoice is separated and identified as an individual PDF file and type. It should be understood that other bitmap or scanned file formats may also be employed. In blocks 104 and 108, two or more patterns and metadata values are extracted from each identified individual invoice file as described with reference to FIG. 1. This may be performed using optical character recognition and/or converting the file to a text file in block 106.

In block 110, the PDF file needs to be associated with its XML file by matching their metadata values. The XML file is a file created by an application and stored in a database for generating an invoice or bill to be sent to the purchaser. As an example, a transaction for a purchase may have been conducted on-line, or at a retail establishment where an individual uses a credit card or debit card. At the time of sale an original receipt is generated with a customer signature and scanned or otherwise photographically captured. In addition, an electronic record is created by the vender, preferably in XML. The vender usually desires to attach the original receipt to the XML document for billing and record keeping purposes. To attach the corresponding original invoice copy for the customer when the customer is billed for payment on a Web application invoice, there is a need to associate each original invoice copy with its XML invoice transaction and processes. Thus, the administrator can retrieve the invoice PDF file and send it to the user as an attachment for requesting cash payment. The metadata values are employed to map the invoice PDF with its corresponding XML.

In this application, a first portal 220 is employed for presentation, user input, and may be generated using a WPF (WebSphere Portal Factory) tool for portal development. A light weight storage service (LSS) or any generic database storage services 142 is used to read, store, replace and delete files. The portlets described herein preferably communicate backend functions by a web service although other communication configurations may be employed.

Engine 300 identifies any invoices where a problem identifying the transaction or transaction type exists and lists these as unresolved in block 122. Then, a user through a user interface or portlet 224 manually enters invoice names and metadata values for each unresolved invoice. Engine 300 may include an Enterprise Resource Planning (ERP) processor 302, which assists in handling the retrieval and processing of files and the distribution and utilization of resources.

Engine 300 preferably implements the following:

1) UnitTest: UnitTest tests system 100 by hardcoding all of the input parameters from a property file instead using a daemon and a property file. A data source is needed by a data bean such that the data bean is independent of the property file. An I2C agent calls IncomingPDFFile by passing the data source parameter. This IncomingPDFFile simulates the work of an I2C agent using an application processing interface (API) instead of a Web service interface.

2) IncomingPDFFile: IncomingPDFFile is called by an Enterprise Resource Planning (ERP) processor or UnitTest using an API or Web services interfaces. A Web service interface has been implemented for this java class for the I2C ERP processor to call. Then, the information on an incoming stack of PDF invoices is stored in Table 5 (see FIG. 5), which will be identified hereinafter.

3) MonitorPDFFile: MonitorPDFFile monitors Table 5 to see whether there are any incoming stacks of PDF invoices. If yes, GenerateInvoice is called to proceed.

4) GenerateInvoice: GenerateInvoice is called by MonitorPDFFile with parameters (e.g., tenant Id, input file key, file name, data source). This is a more important java class since five other java classes are called from this class. A Web service call and light weight storage service (LSS) or any generic database storage services may be employed with the AddResultForTransaction to pass the invoice name and metadata values to the system 100.

5) PDFToText: PDFToText converts a PDF to a text file. A Web service call and LSS are used to store the invoice text file.

6) DocIdentify: DocIdentify identifies individual invoices inside the stack of invoices with its type.

7) MetaExtraction: MetaExtraction extracts metadata from each identified invoice.

8) SeparateFile: SeparateFile separates each identified invoice as an individual PDF file. A Web service call and LSS are used to store the invoice text file.

9) UnresolvedFile: UnresolvedFile creates a stack of unresolved PDF invoices. A Web service call and LSS are employed to store the invoice text file.

10) PortletInput: PortletInput is called by the unresolved invoice portlet (224) to create a user identified invoice PDF file with three parameters (invoice name, first page, last page) entered by the user.

11) PortletSeparate: PortletSeparate is called by the PortletInput.java to separate manually identified invoices. A Web service call and LSS are used to store the invoice text file.

Referring to FIG. 3, portlet 220 (and/or 222) is shown for creating templates and identifying patterns in documents. A Document Scanning Template setup is called in portlet 220 when a user clicks on a link (e.g., Doc Scanning Templates in block 232) in a client setup menu 230. DocScanning Template portlet 220 permits the user to configure document templates for the invoices. This portlet 220 (and/or 222) displays a list 234 of document templates for a tenant. The templates in the list 234 may include invoice, credit memo, journal, remittance, etc.

When the user clicks on any of the document templates, if the template is already configured it will bring up a display page 239. The user can update the details on page 239 for the document template. The page 239 has two parts. A top part 237 is to configure Invoice Patterns and a bottom part 238 is to configure document key variables.

If the user unchecks a Single page document check box 240, the user can configure invoice patterns for additional pages (e.g., a First page and a Last page). The user has to enter at least one invoice pattern to configure the document template. Matching phrase, line number, top or bottom, page values are exemplary parameters needed in the setup process. If the user blanks out phrase and line values, the invoice pattern will be removed for the selected document template.

The user can configure the key variables for the document templates as well. The user has to enter at least one set of key values to configure the document template. If the user blanks out all the fields in the row the key values entries will be removed for the selected document template. When the user clicks on a save button 242 all the changes will be saved for the selected document template. A status message, if any errors occur, will be shown to the user.

The GUIs of the portlet 220 (222) provide an administrator the capabilities to enter at least two unique patterns of the first and last pages of each invoice transaction type. In this portlet 220 (222), an administrator also needs to input at least two metadata labels for extraction of the corresponding metadata values for each invoice transaction type.

For inputting unique patterns and rules for each invoice transaction type to identify each invoice with its transaction type in a stack of PDF invoices, the administrator needs to input at least two unique patterns each for the first page and last page of each invoice transaction type. In one example, for each unique pattern, enter, select or retrieve—TenantId; select—Invoice Type Name; enter—page number (where the unique pattern occurs); select—(counting page number starts from and includes the first page or last page); enter—line number (where the unique pattern occurs); select—(counting line number starts from and includes the top line or bottom line); select—match or missing phrase indicator; enter—phrase (match—at least one; missing—optional). Other inputs may be employed for patterns as well.

For inputting metadata labels for each invoice transaction type to extract their values to map the identified PDF invoice file with its corresponding XML invoice file and use the first metadata value as the PDF invoice's new file name, the administrator needs to input metadata labels for each invoice transaction type, preferably at least two metadata labels. For each metadata label: enter, select or retrieve—TenantId; select—Invoice Type Name; enter—metadata label name in phrase; enter—metadata label in phrase as shown in the PDF document; enter—page number (where the metadata label occurs); enter—line number (where the metadata label occurs); enter—word number (where the metadata label phrase begins including the first word of the metadata label phrase); enter—number of terms (next to the metadata label phrase) to be extracted as its value; select—position (left—terms after the last word of the metadata phrase, right—terms before the first word of the metadata phrase, above—terms located in the preceding above the first word of the phrase, below—terms located in the next line below the first word of the phrase). Other inputs may be employed for metadata as well.

Referring to FIG. 4, portlet 224 for unresolved stacks is illustratively shown. Unscanned Documents Portlet 224 is called when the user clicks on Resolve UnScanned Docs 250 link in Client Setup Menu 230 (FIG. 3). This page 252 displays a list 254 of unresolved invoices or documents. If the user clicks on the file and image or the unresolved document will be shown in a new browser window (not shown). The user can go through the document and identify the document template for the invoice or the invoice itself. To remove any one of the files, the user has to select that file and click on a remove button 253, this action will remove the file from the list.

Once the user selects the file to be resolved from the list 254, information about the file will be displayed in area 256. The user has to click on an Add Document button 257 to enter a start page 260, end page 262 and document key variables 264 for a new selected file. After entering the details, the user clicks on a save button 258 to save.

The user can enter a plurality of document templates for each file. After entering the document template details, when the user clicks on a done button 266, the unresolved document will be resolved and stored. A status message will be shown to the user. If any error occurred, an error message will be displayed.

The GUIs of portlet 224 provide an administrator the capabilities to manually identify the transaction type of each invoice in a stack of unresolved invoices. For inputting file name and values of metadata labels for each manually identified invoice in a stack of unresolved PDF invoices, the administrators need to input metadata values, preferably two, for each identified invoice with each transaction type. For each identified invoice with each transaction type: enter, select or retrieve—TenantId; select—Invoice Transaction Type Name for this identified PDF invoice; enter—file name for the identified PDF invoice; enter—starting page number (in the stack where the identified invoice starts from); enter—ending page number (in the stack where the identified invoice ends); display—the first metadata label in a phrase for the selected invoice transaction type; enter—the first metadata label's corresponding metadata value in the phrase; display—the second metadata label in phrase for the selected invoice transaction type; enter—the second metadata label's corresponding metadata value in the phrase. Other inputs may be employed for metadata and metadata labels as well.

For those pages in the stack of unresolved PDF invoices not being identified as belonging to any of the manually identified invoices, code will replace the stack of unresolved PDF invoices with a new stack of unresolved PDF invoices including these unresolved pages and using the original file name. If all the pages in the stack of unresolved PDF invoices have been identified and belong to the manually identified invoice, then the code will delete this stack.

Referring to FIG. 5, a plurality of tables is described for implementing the system/method in accordance with the present principles. System 100 may include one or more tables to implement functions as described herein. These tables are provided for illustrative purposes to demonstrate the type of information collected and employed at different process stages. A Table 1 (InvoiceType) includes Invoice transaction type numbers (InvoiceTypeNo) and names (InvoiceTypeName) for different tenant Ids (TenantId).

Table 2 (InvoicePattern) includes Patterns and rules for each known invoice transaction type. Two entries are provided for each of the first and last page. PatternRefNum, InvoiceTypeNo, PageNo, FirstLast, LineNo, TopBot, MatchInd, and Phrase are included in Table 2.

Table 3 (MetadataLabel) includes Metadata labels with locations and rules for each known invoice type. Two metadata labels are provided for each invoice transaction type. The columns of Table 3 include MetadataRefNo, InvoiceTypeo, MetadataName, MetadataLabel, PageNo, LineNo, WordNo, NoOfTerms, Position.

Table 4 (MetadataValue) includes Name, URL, and two pairs of metadata names and values for each matched invoice. Value1 is employed as an invoice name for this table, Value1 can be replaced by addResultForTransaction. The columns of Table 4 include InvoiceRefNo, InvoiceTypeNo, LSSFileKey, InvoiceName, Label1, Value1, Label2, and Value2.

Table 5 (InvoiceStack) is for incoming and unresolved stack of invoices. The columns of Table 5 include FileRefNo FileName, TenentId, LSSFileKey, FileName, and FileINd.

Having described preferred embodiments for systems and methods to associate invoice data with a corresponding original invoice copy in a stack of invoices (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for associating documents, comprising:
providing a plurality of scanned documents of different types of transactions;
identifying a transaction type for each scanned document by comparing a determined pattern for each scanned document to known document patterns associated with transaction types;
extracting first and second metadata values from each scanned document using metadata labels, wherein different metadata labels are used according to transaction type;
identifying each scanned document using the first metadata values;
associating a stored electronic record with each scanned document by employing the first metadata values such that a relationship between the stored electronic record and the associated scanned document is determined and stored, wherein associating includes extracting at least one parameter from the stored electronic record to map the stored electronic record to the scanned document having first metadata values matching the at least one parameter; and
verifying the relationship between the stored electronic record and the associated scanned document by employing the second metadata values.

2. The method as recited in claim 1, wherein providing a plurality of scanned documents of different types includes providing a plurality of portable document format documents of different types.

3. The method as recited in claim 1, wherein the different types of transactions include different types of financial transactions.

4. The method as recited in claim 1, further comprising converting the scanned documents to text documents.

5. The method as recited in claim 1, wherein identifying a transaction type includes identifying at least two patterns in each document to compare to the known patterns.

6. The method as recited in claim 5, wherein the patterns are identified on a first and last page of a document.

7. The method as recited in claim 1, further comprising the steps of:
identifying unresolvable scanned documents; and
manually determining at least one of document type and transaction identity for the unresolvable scanned documents.

8. The method as recited in claim 1, wherein one of the scanned documents includes a receipt and the stored electronic record includes an extensible markup language document memorializing a purchase associated with the receipt and further comprising invoicing a customer with an invoice including a copy of the receipt and the extensible markup language document in an on-line application.

9. The method as recited in claim 1, further comprising the step of separating the scanned documents after identification to be stored as individual documents.

10. The method as recited in claim 1, wherein the scanned document represents an original copy of the stored electronic record.

11. The method as recited in claim 1, wherein the first metadata values are used to name a file of the scanned electronic record.

12. A non-transitory computer readable storage medium comprising a computer readable program for associating documents, wherein the computer readable program when executed on a computer causes the computer to perform the steps of:
identifying a transaction type for each scanned document by comparing a determined pattern for each scanned document to known document patterns associated with transaction types;
extracting first and second metadata values from each scanned document using metadata labels, wherein different metadata labels are used according to transaction type;
identifying each scanned document using the first metadata values;
associating a stored electronic record with each scanned document by employing the first metadata values such that a relationship between the stored electronic record and the associated scanned document is determined and stored, wherein associating includes extracting at least one parameter from the stored electronic record to map the stored electronic record to the scanned document having first metadata values matching the at least one parameter; and verifying the relationship between the stored electronic record and the associated scanned document by employing the second metadata values.

13. A method for associating documents, comprising:
providing a plurality of portable document format (PDF) documents representing sales receipts of different types of transactions;
identifying a transaction type for each PDF document by comparing determined patterns in each PDF document to known document patterns associated with transaction types to classify the PDF documents as certain types;
converting each PDF document to a text file;
extracting first and second metadata values from each text file to identify each PDF document by extracting the first and second metadata values using known metadata labels, wherein different metadata labels are used according to transaction type;
associating a stored electronic record with each PDF document by employing the first metadata values such that a relationship between the stored electronic record and the associated PDF document is determined, wherein associating includes extracting at least one parameter from the stored electronic record to map the stored electronic record to the PDF document having first metadata values matching the at least one parameter;
verifying the relationship between the stored electronic record and the PDF document by employing the second metadata values; and
generating an invoice for payment including the stored electronic record and the associated PDF document as an attachment to the stored electronic record.

14. The method as recited in claim 13, wherein the different types of transactions include different types of sales receipt transactions.

15. The method as recited in claim 13, wherein identifying a transaction type includes identifying at least two patterns in each PDF document to compare to the known patterns.

16. The method as recited in claim 15, wherein the patterns are identified on a first and last page of a PDF document.

17. The method as recited in claim 13, further comprising the steps of:
identifying unresolvable PDF documents; and
manually determining at least one of document type and transaction identity for the unresolvable PDF documents.

18. The method as recited in claim 13, wherein the stored electronic record includes an extensible markup language document memorializing a purchase associated with a sales receipt document of the plurality of PDF documents and further comprising invoicing a customer with an invoice including a copy of the receipt and the extensible markup language document in an on-line application.

19. The method as recited in claim 13, further comprising the step of separating the PDF documents after identification to be stored as individual documents.

20. A non-transitory computer readable storage medium comprising a computer readable program for associating documents, wherein the computer readable program when executed on a computer causes the computer to perform the steps in accordance with claim 13.

* * * * *